US006248204B1

(12) United States Patent
Schuft

(10) Patent No.: US 6,248,204 B1
(45) Date of Patent: Jun. 19, 2001

(54) TWO PART, REINFORCED, ROOM TEMPERATURE CURABLE THERMOSETTING EPOXY RESIN COMPOSITIONS WITH IMPROVED ADHESIVE STRENGTH AND FRACTURE TOUGHNESS

(75) Inventor: Charles F. Schuft, Stow, MA (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/312,147

(22) Filed: May 14, 1999

(51) Int. Cl.[7] .................... C08G 59/50; C08L 63/02; C09J 5/04
(52) U.S. Cl. .................. 156/305; 156/307.1; 156/330; 523/428; 525/526; 528/88; 528/104; 528/121
(58) Field of Search .................. 528/88, 104, 121; 523/428; 525/526; 156/330, 305, 307.1

(56) References Cited

U.S. PATENT DOCUMENTS

| 2,651,589 | * | 9/1953 | Shokal et al. ............. 156/330 X |
|---|---|---|---|
| 3,257,342 | | 6/1966 | Kwong . |
| 3,389,037 | * | 6/1968 | Monfort ................... 156/330 X |
| 3,422,063 | * | 1/1969 | Barton et al. ............. 528/121 X |
| 3,637,902 | * | 1/1972 | Dukes et al. ............. 528/88 X |
| 4,101,459 | | 7/1978 | Andrews . |
| 4,129,670 | * | 12/1978 | Riew ....................... 156/330 X |
| 4,255,468 | * | 3/1981 | Olson ...................... 525/526 X |
| 4,590,539 | * | 5/1986 | Sanjana et al. ............ 156/307.1 X |
| 4,668,736 | | 5/1987 | Robins et al. ............. 525/65 |
| 4,704,331 | | 11/1987 | Robins et al. ............. 428/414 |
| 4,772,645 | | 9/1988 | Tarbutton et al. .......... 523/457 |
| 4,778,851 | | 10/1988 | Henton et al. ............. 525/65 |
| 4,803,232 | * | 2/1989 | Shah ....................... 528/88 X |
| 4,846,905 | | 7/1989 | Tarbutton et al. .......... 525/65 |
| 4,948,449 | | 8/1990 | Tarbutton et al. .......... 156/307.3 |
| 5,280,067 | | 1/1994 | Tarbutton et al. .......... 525/65 |
| 5,332,781 | | 7/1994 | Eldin et al. ............... 525/65 |
| 5,356,499 | * | 10/1994 | Decker et al. ............. 156/330 X |
| 5,426,150 | | 6/1995 | Eldin et al. ............... 525/65 |
| 5,458,929 | * | 10/1995 | Earls et al. ............... 528/104 X |
| 5,548,026 | * | 8/1996 | Jorissen et al. ............ 525/526 X |
| 5,629,380 | | 5/1997 | Baldwin et al. ............ 525/113 |
| 5,637,179 | | 6/1997 | Nakayama et al. .......... 156/330 |
| 5,674,337 | * | 10/1997 | Coombs et al. ............. 156/305 X |
| 5,686,509 | | 11/1997 | Nakayama et al. .......... 523/201 |
| 5,691,416 | | 11/1997 | Yoshida et al. ............ 525/117 |
| 6,040,397 | * | 3/2000 | Hooper et al. ............. 525/526 |

FOREIGN PATENT DOCUMENTS

| 0 169 066 | 2/1989 | (EP) | ............... C08G/59/50 |
|---|---|---|---|
| 0 488 949 | 7/1995 | (EP) | ............... C09J/163/00 |
| 0 623 151 | 11/1995 | (EP) | ............... C08G/59/68 |
| WO 96/32454 | 10/1996 | (WO) | ............... C09J/163/00 |

* cited by examiner

*Primary Examiner*—Richard D. Lovering
(74) *Attorney, Agent, or Firm*—Steven C. Bauman

(57) ABSTRACT

The present invention provides a room-temperature curable, reinforced thermosetting epoxy resin composition. The composition includes an epoxy resin first component, and an epoxy resin hardener second component. The epoxy resin component includes an epoxy resin, and may further include an inorganic and/or organic filler component, such as a structural reinforcement component. The epoxy resin hardener component includes an amine-based hardener, and may further include an inorganic and/or organic filler component. Cured reaction products of the composition demonstrate at about room temperature an adhesive strength of at least about 6500 psi, such as about 8000 to about 10000, and a fracture toughness of at least about 10 in-lbs/in$^2$, such as about 20 to about 35 in-lbs/in$^2$. In addition, the cured reaction products of the composition demonstrate a creep resistance at about room temperature at least about 6000 psi of at least about 1 hour. After mixing together the first and second components and at about room temperature, the composition has a pot life of at least about 3 hours at about room temperature, and after application onto a surface of a substrate has a slump resistance at about 30 minutes of less than about 0.5 inches.

38 Claims, No Drawings

TWO PART, REINFORCED, ROOM TEMPERATURE CURABLE THERMOSETTING EPOXY RESIN COMPOSITIONS WITH IMPROVED ADHESIVE STRENGTH AND FRACTURE TOUGHNESS

BACKGROUND OF THE INVENTION

1. Field of the Invention

The present invention provides a room-temperature curable, reinforced thermosetting epoxy resin composition. The composition includes an epoxy resin first component, and an epoxy resin hardener second component. The epoxy resin component includes an epoxy resin, and may further include an inorganic and/or organic filler component, such as a structural reinforcement component. The epoxy resin hardener component includes an amine-based hardener, and may further include an inorganic and/or organic filler component, such as one that confers thixotropy to the composition and added adhesion strength to cured reaction products of the composition. Cured reaction products of the composition demonstrate at about room temperature an adhesive strength of at least about 6500 psi, such as about 8000 to about 10000 psi, and a fracture toughness of at least about 10 in-lbs/in$^2$, such as about 20 to about 35 in-lbs/in$^2$.

Brief Description of Related Technology

Two-part epoxy resin compositions are known. See e.g., U.S. Pat. No. 4,668,736 (Robins). Such compositions are formulated in a two-part manner so as to allow the system to be reactive at room temperature when the two parts are mixed together. Ordinarily, in one of the parts there is provided an epoxy resin and in the other of the parts there is provided a hardener. To one or the other of the parts may be included additional materials to alter the physical properties of either part individually or when mixed together in its uncured state, or of the cured reaction product.

Two-part epoxy resin compositions designed specifically for use in the aerospace industry are also known. However, epoxies generally are recognized as high tensile strength adhesives that are brittle in their cured state. As such, epoxy compositions ordinarily are modified to meet specific end use requirements.

For instance, Dexter Corporation has made available and sold commercially several products for use as an aerospace adhesive. More specifically, in one application, an adhesive product has been provided to assemble the cowl, throat, and fixed housing bond lines in aerospace-related devices, such as the solid rocket booster assembly of the Space Shuttle. Another such adhesive product has been provided to assemble the nose inlet, forward exit cone and aft exit cone of the Space Shuttle. In this application, the adhesive products secure phenolics rings to the metal housings. The phenolic rings provide thermal protection and structural support to the metal housings in the nozzle. The adhesive bonds formed here are critical as failure of one or more of the bonds could be catastrophic to the flight.

While these adhesives have been successful commercially, they use raw materials that will soon become obsolete and/or are now considered as a severe health risk.

Accordingly, there is a need for epoxy resin compositions formulated from new or different raw materials, the supply for which will not be in known jeopardy, and which pose little to no health risks to those persons handling the materials and which are not deemed to be detrimental to the environment.

In addition, there is an ongoing desire to provide epoxy resin compositions generally having physical properties tailored for the specific applications in which they are to be used—e.g. viscosity, longer pot life and slump resistance in the mixed, uncured state, and improved adhesion strength, fracture toughness and creep resistance in the cured reaction product.

However, the combination of high adhesive strength and fracture toughness in a cured adhesive is unusual since epoxy adhesion strength is ordinarily compromised when fracture toughness is introduced.

There, therefore, exists a need for epoxy resin compositions with such tailored physical property profiles as they would be particularly attractive for many uses, even beyond aerospace applications.

SUMMARY OF THE INVENTION

The present invention provides a room-temperature curable, reinforced thermosetting epoxy resin composition. The composition includes an epoxy resin first component, and an epoxy resin hardener second component.

In either of the epoxy resin first component, the epoxy resin hardener second component, or both is also included an inorganic and/or organic filler component. For instance, the epoxy resin component may include as an inorganic and/or organic filler component a structural reinforcement component, and/or the epoxy resin hardener component may include an inorganic and/or organic filler component, such as one that confers thixotropy to the composition and added adhesion strength to cured reaction products of the composition.

Cured reaction products of the composition demonstrate at about room temperature an adhesive strength of at least about 6500 psi, such as about 8000 to about 10000 psi, and a fracture toughness of at least about 10 in-lbs/in$^2$, such as about 20 to 35 in-lbs/in$^2$.

In addition, the cured reaction products of the composition demonstrate a creep resistance at about room temperature at least about 6000 psi of at least about 1 hour, such as about 1 day to about 2 weeks. Creep resistance is a measure of how well a cured adhesive maintains its bond strength when a load (here, 6000 psi) is placed on it over time in an effort to pull apart the substrates which it binds over time.

After mixing together the first and second components at about room temperature, the composition has a pot life of at least about 3 hours at about room temperature, has a slump resistance after application (as a deposit whose dimensions are about 0.2 inches thick and 1.8 square inches circular area) onto a vertical surface of a substrate at about 30 minutes of less than about 0.5 inches, and in certain aspects of the invention becomes substantially tack free within about 3 to about 5 hours after application onto a surface of a substrate at about room temperature.

In a particular aspect of the invention, the epoxy resin component includes two or more epoxy resins, each of which being in a solid crystalline state, which when combined together under elevated temperature conditions, form a flowable mixture.

The invention also provides methods of preparing the inventive compositions as well as methods of using the compositions to bond together two substrates.

Of course, the invention also provides cured reaction products of the inventive compositions.

The benefits and advantages of the present invention will become more readily apparent after a reading of the "Detailed Description of the Invention".

DETAILED DESCRIPTION OF THE INVENTION

As noted above, the present invention provides a room-temperature curable, reinforced thermosetting epoxy resin composition. The composition includes an epoxy resin first component, and an epoxy resin hardener second component.

The epoxy resin component of the present invention may include any common epoxy resin, which may have at least one multifunctional epoxy resin.

Examples of such epoxy resins include $C_4$–$C_{28}$ alkyl glycidyl ethers; $C_2$–$C_{28}$ alkyl- and alkenyl-glycidyl esters; $C_1$–$C_{28}$ alkyl-, mono- and poly-phenol glycidyl ethers; polyglycidyl ethers of pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphyenyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof.

Among the commercially available epoxy resins suitable for use herein are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba-Geigy Corporation; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba-Geigy Corporation. SU-8 is a bisphenol A-type epoxy novolac available from Shell Chemicals (formerly, Interez, Inc.). Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE MY-721, ARALDITE 0500, and ARALDITE 0510 from Ciba-Geigy Corporation and PGA-X and PGA-C from the Sherwin-Williams Co. And of course combinations of the different epoxy resins are also desirable for use herein.

In a particularly desirable aspect of the invention, the epoxy resin component includes the combination of bisphenol F-type epoxy resin and bisphenol A-type epoxy resin. Indeed, with this combination of epoxy resins, which ordinarily as individual resins are in the solid crystalline state, a flowable mixture may be formed upon exposing the combination to elevated temperature conditions, such as about 65° C. The combination of two or more of such epoxy resins is believed to foul each other's ability to crystallize, thereby reducing the chance of crystal formation, and rendering the mixed combination flowable.

This phenomena is particularly desirable where a composition is to have a certain viscosity in its uncured state and yet maintain or achieve as an objective for the application an enhanced adhesion strength from cured reaction products of the composition. Ordinarily, viscosity decreases to render a composition more flowable are made by including a diluent, such as a plasticizer. However, inclusion of such diluent may reduce adhesion strength of the cured reaction products. Engaging the combination of two or more solid crystalline epoxy resins to form a flowable mixture achieves a viscosity adjustment without the often-encountered reduction in adhesion strength.

The epoxy resin component of the composition includes an epoxy resin in an amount within the range of about 70 to about 98 weight percent, based on the total weight of the epoxy resin component, desirable ranges of the bisphenol F-type epoxy resin is from about 25 to about 75 weight percent and the bisphenol A-type epoxy resin is from about 25 to about 75 weight percent, based on the total weight of the epoxy resin component.

In a particularly desirable aspect of the invention, the epoxy resin component includes about 55 weight percent of bisphenol F-type epoxy resin and about 32 weight percent of bisphenol A-type epoxy resin, each of which is based on the total weight of the epoxy resin component.

The epoxy resin component also includes an inorganic and/or organic filler component, which may act as a structural reinforcement component, a thixotropy-conferring component and/or an adhesion strength-conferring component. In the epoxy resin component, the inorganic and/or organic filler component may be chosen from the group of glass fibers, synthetic fibers, reinforcing silicas, ceramic fiber whiskers, aluminum nitride, boron nitride, zinc oxide, magnesium oxide, aluminum oxide, silicon nitride, silica-coated aluminum nitride, quartz, natural fibers, such as ground nut shell, ground feathers and the like, and combinations thereof.

For instance, glass fibers, such as 739 DC milled fiber $\frac{1}{32}$, may be used in an amount up to about 10 weight percent, such as in the range of about 1 to about 3 weight percent, based on the total weight of the epoxy resin component.

Synthetic fibers, such as KEVLAR ARAMID fibers 1F835, available commercially from DuPont, may be in an amount up to about 10 weight percent, such as in the range of about 0.5 to about 3 weight percent, based on the total weight of the epoxy resin component.

Reinforcing silicas, such as fused or fumed silicas, may be untreated or treated so as to alter the chemical nature of their surface. Virtually any reinforcing fused or fumed silica may be used.

Examples of such treated fumed silicas include polydimethylsiloxane-treated silicas and hexamethyldisilazane-treated silicas. Such treated silicas are commercially available, such as from Cabot Corporation under the tradename CAB-O-SIL ND-TS, TS610 or TS710, and Degussa Corporation under the tradename AEROSIL, such as AEROSIL R805 or R8200.

Of the untreated silicas, amorphous and hydrous silicas may be used. For instance, commercially available amorphous silicas include AEROSIL 300 with an average particle size of the primary particles of about 7 nm, AEROSIL 200 with an average particle size of the primary particles of about 12 nm, AEROSIL 130 with an average size of the primary particles of about 16 nm; and commercially available hydrous silicas include NIPSIL E150 with an average particle size of 4.5 nm, NIPSIL E200A with and average particle size of 2.0 nm, and NIPSIL E220A with an average particle size of 1.0 nm (manufactured by Japan Silica Kogya Inc.).

A particularly desirable fumed silica is hydrophobic fumed silica, such as AEROSIL R8200, which is treated to render a substantial portion of its silanol groups capped with a polymethylsiloxane moiety. This hydrophobic fumed silica is a particularly desirable choice to act as a structural reinforcement component.

A particularly desirable fumed silica to act as a thixotropy conferring and/or adhesion strength-conferring is CAB-O-SIL TS610.

When used, the fumed silica portion of the inorganic filler component which acts to confer structural reinforcement may be included in an amount up to about 20 weight percent, such as in the range of about 5 to about 15 weight percent, desirably about 8 to about 10 weight percent, based on the total weight of the epoxy resin component.

In total, the inorganic and/or organic filler component should be used in an amount within the range of about 0.5 to about 35 weight percent based on the total weight of the epoxy resin component.

Optionally, the inventive composition may include in the epoxy resin component an adhesion promoter. The adhesion promoter is ordinarily a silane-based adhesion promoter, such as octyl trimethoxy silane, glycidyl trimethoxy silane, methacryloxy propyl trimethoxy silane, aminosilane, mercaptosilane, and other functionalized silanes, and combinations thereof.

When present, the adhesion promotor should be used in an amount within the range of about 0.05 to about 5 weight percent, based on the total weight of the epoxy resin component.

In the epoxy resin hardener component is included polyether amine-based hardeners, such as oxyethylene diamines, oxyethylene triamines, polyoxyethylene diamines, polyoxyethylene triamines, oxypropylene diamines, oxypropylene triamines, polyoxypropylene diamines, polyoxypropylene triamines, dimethylene glycol dipropyl amine and/or derivatives and adducts thereof, and combinations thereof.

Commercially available examples of such polyether amine-based hardeners include those from BASF CORPORATION, Mt. Olive, N.J., under the trade designation 4,7,10 TTD, and Huntsman Corporation, Houston, Tex., under the JEFFAMINE tradename, such as JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof.

The JEFFAMINE D series are diamine based products and may be represented by

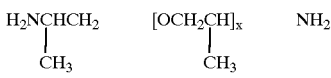

(CAS Registry No. 904610-0)

where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by

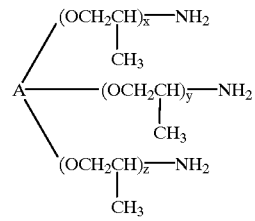

where x, y and z are set forth below in Table A.

TABLE A

| | JEFFAMINE | Approx. | Mole |
|---|---|---|---|
| Product | Initiator (A) | Mol. Wt | PO |
| T-403 | Trimethylolpropane | 440 | 5–6 |
| T-3000 | Glycerine | 3,000 | 50 |
| T-5000 | Glycerine | 5,000 | 85 |

Additional hardeners available commercially include those from Air products, such as those under the ANCAMIDE tradename like ANCAMIDE 2353 (accelerator-modified polyamide).

More specifically, the JEFFAMINE T-403 product is a trifunctional amine and may be represented by

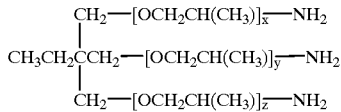

where x+y+z is 5.3
(CAS Registry No. 39423-51-3)

The JEFFAMINE ED series are polyether diamine-based products and may be represented by

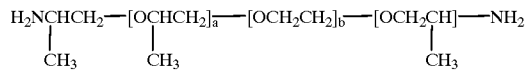

where a, b and c are set forth below in Table B.

TABLE B

| JEFFAMINE | Approx. Value | | Approx. |
|---|---|---|---|
| Product | B | a + c | Mol. Wt |
| ED-600 | 8.5 | 2.5 | 600 |
| ED-900 | 15.5 | 2.5 | 900 |
| ED-2001 | 40.5 | 2.5 | 2,000 |

The amine-based hardener should be used in an amount within the range of about 10 to about 100 weight percent, such as about 50 to about 75 weight percent, based on the total weight of the epoxy resin hardener second component.

The epoxy resin hardener component may also include an inorganic and/or organic filler component, such as any of those recited above. The inorganic filler component here confers thixotropy to the composition in its uncured state and improved adhesive strength to the cured reaction products of the composition. Desirably, the filler component is hydrophobic fumed silica, such as CAB-O-SIL TS610. The amount of the inorganic and/or organic filler component in the epoxy resin hardener component should be up to about 25 weight percent, such as within the range of about 10 to about 20 weight percent, desirably 15 weight percent, based on the total weight of the epoxy resin hardener component.

Optionally, and where improved cure time is desired to provide cured reaction products that become substantially tack free in a period of time under about 5 hours, such as under about 3 hours, an accelerator may be included. Appropriate accelerators include nonylphenol, dinonylphenol, piperazine, and triethanolamine (all of which are available commercially from Huntsman Corporation). Other accelerators include water, alcohols, other phenolics, fast curing amines, and acids and their salts. Of course, combinations of these accelerators may also be used.

When present, the accelerator may be used in an amount up to about 50 weight percent, such as about 0.5 to about 15 weight percent based on the total weight of the epoxy resin hardener component.

The epoxy resin first component should be used in a ratio to the epoxy resin hardener second component, in the range of about 1:1 to about 10:1, such as about 2:1. Of course, those persons of ordinary skill in the art will be able to make appropriate choices among the various components based on the description of the invention and the representative examples and guidelines set forth herein, to prepare a composition suitable to achieve the desired objective at hand.

The composition ordinarily has a shear thinning viscosity of less than about 300,000 cps at higher shear rates at about room temperature.

The composition is useful in many applications, such as bonding together substrates, at least one of which is contructed of a metal or a synthetic material. Examples of such metals include steel and aluminum; and of the synthetic materials are of glass cloth phenolics and phenolic composites.

The present invention also provides processes for using the inventive compositions to bond together two substrates. For instance, in one such process, the composition is applied onto a surface of a first substrate, and thereafter a surface of a second substrate is mated in abutting relationship with the composition-applied first substrate to form an assembly. The mated assembly is then maintained in the abutting relationship for a time sufficient to allow the composition to cure.

In an alternative process, the composition is applied onto a surface of at least one of a first substrate or a second substrate, and each of the composition-applied substrate(s) is maintained away from the other substrate for a time sufficient to allow the composition to cure. Then, the substrates are mated in abutting relationship to form an assembly.

In yet another alternative process, a first substrate is mated in spaced apart relationship with a second substrate, and within the space the composition is applied or dispensed. The assembly of the first substrate and the second substrate is then maintained in the relationship for a time sufficient to allow the composition to cure.

Generally, it is desirable to prepare the thermosetting resin compositions of this invention by selecting the types and proportions of various constituents of the two components—i.e., the epoxy resin first component and the epoxy resin hardener second component—so that the adhesive strength of the cured reaction product at about room temperature is at least about 6500 psi, desirably in the range of about 8000 to about 10000 psi, and the fracture toughness at about room temperature is at least about 10 in-lbs/in$^2$, such as about 20 to about 35 in-lbs/in$^2$. Moreover, the types and proportions of various constituents should be chosen such that when the two components are mixed together the pot life of the composition should be greater than about 3 to about 5 hours before any substantial increase in viscosity is observed.

Optionally, the thermosetting resin composition of the present invention may further contain other additives such as defoaming agents, leveling agents, dyes, pigments and fillers.

The amount of thermosetting resin composition applied to a substrate surface should be suitably adjusted depending on the nature and dimensions of the substrate and the demands of the application at hand.

Thermosetting resin compositions of the present invention may ordinarily be cured under atmospheric conditions after application onto the desired substrate.

As will be demonstrated in the Examples section, cured reaction products of the inventive composition demonstrate at about room temperature an adhesive strength of at least about 6500 psi, desirably in the range of about 8000 to about 10000 psi, and a fracture toughness of at least about 10 in-lbs/in$^2$, such as about 20 to about 35 in-lbs/in$^2$.

The present invention will be more readily appreciated with reference to the examples, which follow.

EXAMPLES

In these examples, compositions in accordance with the present invention were prepared and evaluated for performance in contrast with control compositions (see Tables 1 and 2), results for which are set forth below (see Tables 3 and 4).

Two-part, reinforced, room temperature curable thermosetting resin compositions were prepared by mixing together with stirring for a period of time of about 10 minutes at room temperature in a first open vessel the constituents as set forth in Table 1-A of the epoxy resin component. In addition, the hardener component of the two part compositions were prepared by mixing together, with stirring for a period of time of about 10 minutes at room temperature in a second open vessel, the constituents as set forth in Table 1-B of the hardener component.

TABLE 1

| | | Epoxy Resin - A | | | | | |
|---|---|---|---|---|---|---|---|
| | Component | Epoxy Resin No./Amt. (wt %) | | | | | |
| Type | Identity | 1 | 2 | 3 | 4 | 5 | 6 |
| Epoxy Resin | Bisphenol-F (Ciba GY285) | 60 | 60 | 60 | 60 | 45 | 45 |
| | Bisphenol-A | 34 | 34 | 34 | 34 | 25 | 25 |

TABLE 1-continued

| Type | Identity | | | | | | |
|------|----------|---|---|---|---|---|---|
| | (DER 332) Epoxidized Hydrogenated Castor Oil (EPO-TUFF 37-151) | — | — | — | — | 24 | — |
| Structural Reinf. | Hydrophobic Fumed Silica (Degussa R8200) | 9.1 | 9.1 | 9.1 | 9.1 | 9.1 | 9.1 |
| | ARAMID Fiber (KEVLAR 1F835) | 1 | 1 | 1 | 1 | 1 | 1 |
| | Glass Fiber (739 DC Milled Fiber 1/32) | 2 | 2 | 2 | 2 | 2 | 2 |
| | Ceramic Fiber Whisker (FF-HS-70) | — | 21.44 | — | — | — | — |
| Adhesion Promotor | OSI-187 | 1.1 | 1.1 | 1.1 | 1.1 | 1.1 | 1.1 |
| Plasticizer | Cyclohexyl pyrolidone | — | — | 1 | — | — | — |

Hardener - B

| Component | | Hardener No./Amt. (wt %) | | | | | | | |
|-----------|--|---|---|---|---|---|---|---|---|
| Type | Identity | 1 | 2 | 3 | 4 | 5 | 6 | 7 | 8 |
| Hardener | JEFFAMINE D-230 | 25 | 16.5 | 33 | — | — | — | — | 27.5 |
| | JEFFAMINE D-400 | 8 | 16.5 | — | — | 10.4 | 20.8 | — | — |
| | JEFFAMINE T-5000 | — | — | — | — | 10.4 | 20.8 | — | — |
| | ANCAMIDE 2353 | — | — | 33 | 55 | 55 | 55 | 55 | 55 |
| | Flexible Polyamide | — | — | — | — | — | — | — | — |
| Inorganic Filler | Degussa R8200 | — | — | — | — | — | — | 29.84 | — |
| | Nylon 1382D | — | — | — | — | — | — | — | — |
| Accelerator | JEFFAMINE 399 | 1 | 1 | 1 | 1 | 1 | 1 | 1 | 1 |
| | Nonylphenol | 5 | 5 | 5 | 5 | 5 | 5 | 5 | 5 |

| Component | | Hardener No./Amt. (wt %) | | | | | | | |
|-----------|--|---|---|---|---|---|---|---|---|
| Type | Identity | 9 | 10 | 11 | 12 | 13 | 14 | 15 | 16 |
| Hardener | JEFFAMINE D-230 | 27.5 | 27.5 | 27.5 | 27.5 | 33 | 5 | 30 | 31.27 |
| | JEFFAMINE D-400 | 27.5 | 27.5 | 27.5 | 27.5 | — | 8 | — | — |
| | JEFFAMINE T-5000 | — | 9.2 | — | — | 10.4 | — | — | — |
| | ANCAMIDE 2353 | 55 | 55 | 55 | 55 | — | — | — | — |
| | Flexible Polyamide | — | — | — | — | — | — | 3 | — |
| Inorganic Filler | Degussa R8200 | — | — | 25.1 | 20.9 | — | 23.28 | — | — |
| | Nylon 1382D | 20 | — | — | — | — | — | — | 10 |
| Accelerator | JEFFAMINE 399 | 1 | 1 | 1 | 1 | 1 | 1 | 1 | 1 |
| | Nonylphenol | 5 | 5 | 5 | 5 | 5 | 5 | 5 | 5 |

TABLE 2

| Sample No. | Component | | | |
|---|---|---|---|---|
| | Epoxy Resin -- A | (wt %) | Hardener -- B | (wt %) |
| 1 | 1 | 107.2 | 1 | 43 |
| 2 | 1 | 107.2 | 2 | 49.5 |
| 3 | 1 | 107.2 | 3 | 47 |
| 4 | 1 | 107.2 | 4 | 63.5 |
| 5 | 1 | 107.2 | 5 | 74 |
| 6 | 1 | 107.2 | 6 | 84.5 |
| 7 | 1 | 107.2 | 7 | 93.5 |
| 8 | 2 | 128.5 | 4 | 63.5 |
| 9 | 1 | 107.2 | 8 | 53 |
| 10 | 3 | 108 | 9 | 73 |
| 11 | 4 | 107.2 | 8 | 52 |
| 12 | 1 | 107.2 | 10 | 62.5 |
| 13 | 1 | 107.2 | 11 | 78.2 |
| 14 | 5 | 107.2 | 11 | 65.1 |
| 15 | 6 | 107.2 | 11 | 68 |
| 16 | 1 | 107.2 | 12 | 44 |

TABLE 2-continued

| Sample No. | Component | | | |
|---|---|---|---|---|
| | Epoxy Resin -- A | (wt %) | Hardener -- B | (wt %) |
| 17 | 1 | 107.2 | 13 | 49.5 |
| 18 | 1 | 107.2 | 14 | 66.5 |
| 19 | 1 | 107.2 | 15 | 41.5 |
| 20 | 1 | 107.2 | 16 | 47.5 |
| 21* | 1 | 107.2 | 12 | 44 |

*4.5 weight percent of CAB-O-SIL TS610 was also added to the hardener component as a thixotropy-conferring and adhesion strength-conferring component.

Where applicable, the two components of the composition were transferred in correct volume ratio (such as about 2:1 epoxy resin:hardener) to a double barrel syringe or cartridge having 2 parallel barrels made of non-reactive plastic. The syringe or cartridge is equipped with a mixing chamber disposed in a location intermediate between the cartridges and the dispense nozzle.

The composition may be used upon formation, or stored for a period of time of up to about 1 to about 2 years at about room temperature without experiencing observable viscosity increases.

Once the components of the composition were mixed together, the pot life was observed as set forth in Table 3. That is, pot life was determined through observation of the extent of viscosity increase of the composition to a non-trowlable consistency over time, with the time values also provided in Table 3.

Slump resistance (or yield point or yield stress) may generally be thought of as the minimum stress required to cause a material to flow. More specifically, slump resistance may be measured here in two ways. First, the desired slump resistance performance should be measured as the number of inches a deposited composition moves in a period of time of 30 minutes, with the value being at or close to zero. Where a composition does not meet such criteria, slump resistance performance may also be measured by the amount of time elapsed for a deposited composition to reach a distance of 4 inches. These values are presented in Table 3.

TABLE 3

| Sample No. | Physical Properties -- Mixed, Uncured | | |
|---|---|---|---|
| | Pot Life (hr) | Slump resistance | |
| | | min. to 4 in. | in. @ 30 min. |
| 1 | >4.5 | 13 | |
| 2 | >4 | 6 | |
| 3 | 4 | 9 | |
| 4 | 5.5 | 3 | |
| 5 | 5.5 | 2 | |
| 6 | 7 | 2 | |
| 7 | 3 | | 0 |
| 8 | 3.5 | | 0 |
| 9 | 4 | 3 | |
| 10 | 4 | 7 | |
| 11 | 6 | 4 | |
| 12 | 6.5 | 2 | |
| 13 | 3.5 | | 0 |
| 14 | 3 | | 0 |
| 15 | 5 | | 0 |
| 16 | 7.5 | 9 | |
| 17 | >8.5 | 4 | |
| 18 | 5 | | 0 |
| 19 | >6.5 | 1 | |
| 20 | 5 | 1 | |
| 21 | 3–5.25 | | <0.5 |

Sample No. 21 was also determined to have a viscosity at room temperature as measured by a Brookfield viscometer of over 500,000 cps (HBT, TD spindle, 5 rpm).

Separately, the composition was placed between a pair of circular steel disks, brought together and maintained in place while the composition cured to determine adhesion strength. The cured composition was found to have the adhesion strength as set forth in Table 4.

TABLE 4

| Sample No. | Physical Property-- Cured | |
|---|---|---|
| | Adh. Str. (psi) | Fracture Toughness (in-lbs/in$^2$) |
| 1 | 9920 | 2.9 |
| 2 | 9710 | 3.5 |
| 3 | 9140 | 1 |
| 4 | 8810 | — |
| 5 | 7260 | 22.6 |
| 6 | 6710 | 18.7 |
| 7 | 7650 | — |
| 6 | 7990 | 4.6 |
| 9 | 8540 | 2.9 |
| 10 | 7520 | — |
| 11 | 7760 | — |
| 12 | 8160 | 28.2 |
| 13 | 5510 | 1.6 |
| 14 | 6800 | — |
| 15 | 5760 | — |
| 16 | 8630 | 28.4 |
| 17 | 7040 | 47.5 |
| 18 | 8300 | 3.1 |
| 19 | 7910 | 3 |
| 20 | 7480 | 35.8 |
| 21 | 9500 | 32 |

Sample No. 21 was also determined to have a creep resistance within the range of about 15 to about 400 hours at 6000 psi at about room temperature.

Based on the physical performance of the listed compositions in Tables 3 and 4, it is clear that Sample Nos. 5, 6, 12, 16, 17, 20 and 21 are within the scope of the invention.

In a variation of the inventive compositions so described and exemplified, a "quick kit" may be prepared that is dry to the touch within about 3 to 5 hours, such as about 3.5 hours. This version may be used to repair or fill voids or pits that form during application, cure and machining of the part with which the adhesive is used. In this version about 90 parts of epoxy resin 1 are mixed with about 10 parts of a polyacrylate, such as trimethylol propane triacrylate, to prepare the epoxy resin component. In addition, the following components are used in the amount recited to prepare the hardener component, as set forth in Table 5.

TABLE 5

| Component | | Amt./ |
|---|---|---|
| Type | Identity | Parts |
| Hardener | CAPCURE EH-30 | 4.25 |
| | ATBN | 7.16 |
| | 4,7,10 TTD | 66.85 |
| Inorganic Filler | CAB-O-SIL TS710 | 5.82 |
| Accelerator | FC-520 | 8.5 |

In addition, a defoaming agent (0.01 parts), glycerine (4.47 parts) and aromatic alcohol (0.84 parts) are included in the hardener component. CAPCURE EH-30 is tris(dimethyl aminomethyl)phenol, ATBN is amine-terminated butadiene nitrile, and 4,7,10 TTD is diethylene glycol dipropyl amine.

The epoxy resin component:hardener component ratio is about 2:1.

The "quick kit" version may be bonded to a cured parent epoxy adhesive (such as Sample No. 21), and in such case is found to have an adhesion strength over 6000 psi—i.e., 6180 psi. When bonded directly to steel, the cured adhesive was found to have an adhesion strength of over 6500 psi—i.e., 6620 psi.

While described in detail above, the true scope of the invention is measured by the claims.

What is claimed is:

1. A room-temperature curable, reinforced thermosetting epoxy resin composition, comprising:
   (a) an epoxy resin first component, comprising an epoxy resin; and
   (b) an epoxy resin hardener second component, comprising an amine-based hardener;
   wherein the epoxy resin composition further comprises a structural reinforcement component that includes a hydrophobic fumed silica in an amount of about 5 to about 20 weight percent, based on the epoxy resin component, wherein either the epoxy resin component, the epoxy resin hardener component, or both, further comprise an inorganic and/or organic filler component, and wherein cured reaction products of the composition demonstrate at about room temperature an adhesive strength of at least about 6500 psi and a fracture toughness of at least about 10 in-lbs/in$^2$.

2. The composition according to claim 1, wherein the epoxy resin component includes epoxy resins selected from the group consisting of $C_4$–$C_{28}$ alkyl glycidyl ethers; $C_2$–$C_{28}$ alkyl- and alkenyl-glycidyl esters; $C_1$–$C_{28}$ alkyl-, mono- and poly-phenol glycidyl ethers; polyglycidyl ethers of pyrocatechol, resorcinol, hydroquinone, 4,4'-dihydroxydiphenyl methane, 4,4'-dihydroxy-3,3'-dimethyldiphenyl methane, 4,4'-dihydroxydiphenyl dimethyl methane, 4,4'-dihydroxydiphenyl methyl methane, 4,4'-dihydroxydiphenyl cyclohexane, 4,4'-dihydroxy-3,3'-dimethyldiphenyl propane, 4,4'dihydroxydiphenyl sulfone, and tris(4-hydroxyphyenyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'diaminodiphenyl methane; N,N,N',N'-tetraglycidyl-4,4'diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof.

3. The composition according to claim 1, wherein the epoxy resin component includes the combination of bisphenol F-type epoxy resin and bisphenol A-type epoxy resin.

4. The composition according to claim 1, wherein the epoxy resin component includes the epoxy resin in an amount within the range of about 70 to about 98 weight percent, based on the total weight of the epoxy resin component.

5. The composition according to claim 1, wherein the epoxy resin component includes about 55 weight percent of bisphenol F-type epoxy resin and about 32 weight percent of bisphenol A-type epoxy resin, each of which is based on the total weight of the epoxy resin component.

6. The composition according to claim 1, wherein the epoxy resin component includes two or more epoxy resins, each of which being in a solid crystalline state, which when combined together under elevated temperature conditions, form a flowable mixture.

7. The composition according to claim 1, wherein the inorganic and/or organic filler component is a structural reinforcement component selected from the group consisting of glass fibers, synthetic fibers, reinforcing silicas, ceramic fiber whiskers, aluminum nitride, boron nitride, zinc oxide, magnesium oxide, aluminum oxide, silicon nitride, silica-coated aluminum nitride, quartz, natural fibers from plant and/or animal sources, and combinations thereof.

8. The composition according to claim 1, wherein the inorganic and/or organic filler component is a thixotropy-conferring component.

9. The composition according to claim 1, wherein the inorganic and/or organic filler component is an adhesion strength-conferring component.

10. The composition according to claim 1, wherein the inorganic and/or organic filler component is present in an amount within the range of about 0.5 to about 35 weight percent, based on the total weight of the epoxy resin component.

11. The composition according to claim 1, further comprising an adhesion promoter.

12. The composition according to claim 11, wherein the adhesion promoter is a silane based adhesion promoter selected from the group consisting of octyl trimethoxy silane, glycidyl trimethoxy silane, methacryloxy propyl trimethoxy silane, and combinations thereof.

13. The composition according to claim 11, wherein the epoxy resin component includes the adhesion promoter in an amount within the range of about 0.05 to about 5 weight percent, based on the total weight of the epoxy resin component.

14. The composition according to claim 1, wherein the epoxy resin hardener second component includes polyether amine-based hardeners selected from the group consisting of oxyethylene diamines, oxyethylene triamines, polyoxyethylene diamines, polyoxyethylene triamines, oxypropylene diamines, oxypropylene triamines, polyoxypropylene diamines, polyoxypropylene triamines, diethylene glycol dipropyl amine, and combinations thereof.

15. The composition according to claim 1, wherein the epoxy resin hardener second component includes polyether amine-based hardeners selected from the group consisting of JEFFAMINE D-230, JEFFAMINE D-400, JEFFAMINE D-2000, JEFFAMINE T-403, JEFFAMINE ED-600, JEF- FAMINE ED-900, JEFFAMINE ED-2001, JEFFAMINE EDR-148, JEFFAMINE XTJ-509, JEFFAMINE T-3000, JEFFAMINE T-5000, 4,7,10 TTD and combinations thereof.

16. The composition according to claim 1, wherein the epoxy resin hardener second component includes an amine-based hardener in an amount within the range of about 10 to about 100 weight percent, based on the total weight of the epoxy resin hardener second component.

17. The composition according to claim 1, wherein the inorganic and/or organic filler component is fumed silica.

18. The composition according to claim 1, wherein the epoxy resin hardener second component further includes an accelerator.

19. The composition according to claim 18, wherein the accelerator is selected from the group consisting of nonylphenol, dinonylphenol, piperazine, triethanolamine, water, alcohols, acids and their salts, and combinations thereof.

20. The composition according to claim 18, wherein the epoxy resin hardener second component includes an accelerator in an amount up to about 50 weight percent, based on the total weight of the epoxy resin hardener second component.

21. The composition according to claim 1, wherein the epoxy resin component:hardener component ratio is in the range of about 1:1 to about 10:1.

22. The composition according to claim 1, wherein the epoxy resin component:hardener component ratio is about 2:1.

23. The composition according to claim 1, wherein, when the epoxy resin first component and the epoxy resin hardener second component are mixed together, the composition has a pot life of at least about 3 hours at about room temperature.

24. The composition according to claim 1, wherein, when the epoxy resin first component and the epoxy resin hardener second component are mixed together, the composition after application onto a surface of a substrate has a slump resistance at about 30 minutes of less than about 0.5 inches.

25. The composition according to claim 1, wherein, when the epoxy resin first component and the epoxy resin hardener second component are mixed together, the composition becomes substantially tack free within about 3 hours at about room temperature.

26. The composition according to claim 1, wherein cured reaction products of the composition demonstrate a creep resistance at about room temperature at least about 6000 psi of at least about 1 hour.

27. The composition according to claim 1, which has a viscosity of less than about 300,000 cps under shear at about room temperature.

28. Reaction products from the composition according to claim 1.

29. A process for using the composition according to claim 1 to bond together two substrates, comprising the steps of:
applying the composition onto a surface of a first substrate; and
mating a surface of a second substrate in abutting relationship with the composition-applied first substrate to form an assembly, and maintaining the assembly in the mated abutting relationship for a time sufficient to allow the composition to cure.

30. The method according to claim 25, wherein at least one of the substrates is contructed of metals selected from the group consisting of steel and aluminum; and synthetics constructed from materials selected from the group consisting of glass cloth phenolics and phenolic composites, and combination thereof.

31. A process for using the composition according to claim 1 to bond together two substrates, comprising the steps of:
applying the composition onto a surface of at least one of a first substrate or a second substrate, and maintaining each of the composition-applied substrate(s) away from the other substrate for a time sufficient to allow the composition to cure; and
mating the substrates in abutting relationship to form an assembly.

32. The method according to claim 31, wherein at least one of the substrates is contructed of metals selected from the group consisting of steel and aluminum; and synthetics constructed from materials selected from the group consisting of glass cloth phenolics and phenolic composites, and combinations thereof.

33. A process for using the composition according to claim 1 to bond together two substrates, comprising the steps of:
mating in spaced-apart relationship a first substrate with a second substrate; and
applying within the space the composition and maintaining in an assembly the first substrate and the second substrate for a time sufficient to allow the composition to cure.

34. The method according to claim 33, wherein at least one of the substrates is constructed of metals selected from the group consisting of steel and aluminum; and synthetics constructed from materials selected from the group consisting of glass cloth phenolics and phenolic composites, and combinations thereof.

35. A room-temperature curable, reinforced thermosetting epoxy resin composition, comprising:
(a) an epoxy resin component;
(b) a structural reinforcement component that includes a hydrophobic fumed silica in an amount of about 5 to about 20 weight percent, based on the epoxy resin component; and
(c) an epoxy resin hardener component, wherein cured reaction products of the composition demonstrate at about room temperature an adhesive strength of at least about 6500 psi and a fracture toughness of at least about 10 in-lbs/in$^2$.

36. A thermosetting epoxy resin composition, comprising:
(a) an epoxy resin component, comprising:
(i) the combination of bisphenol F-type epoxy resin and bisphenol A-type epoxy resin, in a combined amount within the range of from about 70 to about 98 weight percent, based on the total weight of the epoxy resin component,
(ii) a first structural reinforcement component that includes hydrophobic fumed silicas in an amount of about 5 to about 20 weight percent, based on the total weight of the epoxy resin component, and
(iii) optionally, a second structural reinforcement component selected from the group consisting of: glass fibers, synthetic fibers, ceramic fiber whiskers, aluminum nitride, boron nitride, zinc oxide, magnesium oxide, aluminum oxide, silicon nitride, silica-coated aluminum nitride, quartz, natural fibers from plant and/or animal sources, and combinations thereof;
(b) an epoxy resin hardener component, comprising:
(i) a polyether amine-based hardener selected from the group consisting of oxyethylene diamines, oxyethylene triamines, polyoxyethylene diamines, polyoxyethylene triamines, oxypropylene diamines, oxypropylene triamines, polyoxypropylene diamines, polyoxypropylene triamines, diethylene glycol dipropyl amine and/or derivatives and adducts thereof, and combinations thereof, in an amount within the range of about 50 to about 100 weight percent, based on the total weight of the epoxy resin hardener second component, and (ii) an inorganic and/or organic filler component capable of conferring thixotropy to the composition and improved adhesive strength to cured reaction products thereof.

37. The composition according to claim 36, wherein the epoxy resin component includes about 55 weight percent of bisphenol F-type epoxy resin and about 32 weight percent of bisphenol A-type epoxy resin, each of which being in a solid crystalline state, which when combined together under elevated temperature conditions, form a flowable mixture and each of which is based on the total weight of the epoxy resin component.

38. The composition according to claim 36, further comprising an adhesion promoter selected from the group consisting of octyl trimethoxy silane, glycidyl trimethoxy silane, methacryloxy propyl trimethoxy silane, aminosilane, mercaptosilane, and combinations thereof, in an amount within the range of about 0.05 to about 5 weight percent, based on the total weight of the epoxy resin component.

* * * * *

UNITED STATES PATENT AND TRADEMARK OFFICE
CERTIFICATE OF CORRECTION

PATENT NO. : 6,248,204 B1
DATED : June 19, 2001
INVENTOR(S) : Charles F. Schuft

It is certified that error appears in the above-identified patent and that said Letters Patent is hereby corrected as shown below:

Column 13,
Line 9, TABLE 5, the third number in the "Amt./Parts" delete "66.85" and replace with -- 68.85 --.

Signed and Sealed this

Thirteenth Day of August, 2002

*Attest:*

*Attesting Officer*

JAMES E. ROGAN
*Director of the United States Patent and Trademark Office*